United States Patent [19]
DeGroff

[11] Patent Number: 5,938,147
[45] Date of Patent: Aug. 17, 1999

[54] SAFETY PITOT TUBE COVER

[76] Inventor: Steve A. DeGroff, 150 Forest Park Dr., Berne, Ind. 46711

[21] Appl. No.: 09/005,785
[22] Filed: Jan. 12, 1998
[51] Int. Cl.⁶ .................................................. B64D 45/00
[52] U.S. Cl. ......................... 244/1 R; 244/121; 244/3.16
[58] Field of Search .................................. 244/1 R, 121, 244/3.16; 102/293

[56] References Cited

U.S. PATENT DOCUMENTS

| Re. 35,831 | 6/1998 | Wright et al. . |
| 3,106,374 | 10/1963 | Olson et al. . |
| 3,266,755 | 8/1966 | West . |
| 4,423,660 | 1/1984 | Ouellette . |
| 5,026,001 | 6/1991 | Wright et al. . |
| 5,127,265 | 7/1992 | Williamson et al. . |
| 5,660,357 | 8/1997 | Grossman et al. . |
| 5,744,748 | 4/1998 | Mikhail . |

*Primary Examiner*—Charles T. Jordan
*Assistant Examiner*—Tien Dinh
*Attorney, Agent, or Firm*—Robert G. Lev

[57] ABSTRACT

A pitot tube cover is arranged with a slot to encompass the pitot tube and a wind surface that is perpendicular to the direction of travel of the vehicle upon which the pitot tube is mounted. Once the vehicle reaches a predetermined speed, sufficient force is applied against the wind surface that causes the cover to rotate about a pivot area, freeing itself from the pitot tube and allowing the pitot tube to operate normally.

11 Claims, 2 Drawing Sheets

SAFETY PITOT TUBE COVER

FIELD OF THE INVENTION

The present invention is generally related to pitot tube covers for vehicles, and in particular is directed to a pitot tube cover which is removed automatically by vehicle air speed.

BACKGROUND ART

All aircraft (and occasionally other high speed vehicles), whether small general aviation aircraft or large airliners, have at least one pitot tube. Normally, a pitot tube extends from the airframe in various locations depending upon the particular aircraft configuration and range of speed. The pitot tube has an opening, generally circular, facing forward. The opening is exposed to ram air pressure while the aircraft is moving through the air. This ram air pressure is transmitted to an airspeed indicator in the aircraft or other vehicle instrument panel via air tubes. The aircraft's speed through the air can then be displayed for the pilot.

Knowledge of airspeed is very important to the pilot or operator of any high speed vehicle in order to ensure safe travel. When visibility is limited (as when flying in clouds where reference to instruments is necessary to conduct normal flight attitudes and navigation), if accurate airspeed is not available to the pilot, safe operation of the aircraft is highly unlikely.

Contamination of pitot tubes can occur from a number of other sources such as:

1. Moisture that does not drain from the tube when flying in rain or after the aircraft has been washed or has been exposed to blowing rain while on the ramp.
2. Cleaning and/or polishing agents.
3. Paint during a re-painting process on the aircraft.
4. Insects or spiders that build nests within pitot tubes.

Moisture is generally not a problem because most pitot tubes have a drain hole that allows the automatic removal of moisture. Cleaning agents and paint generally are not a problem because the pitot tube is generally masked off during waxing and/or removed during painting, then returned to normal before flight.

Unfortunately, insects, spiders or other vermin enter and/or build nests within the pitot tubes thereby interfering with an accurate reading of the ram air pressure and, thus, the air speed. To prevent this, pitot tube covers are normally used for covering the pitot tube when the airplane is grounded or otherwise has no need for airspeed indication. Conventional types of pitot tube covers are often costly and complicated. Further, on occasion, they are forgotten and not removed prior to flight. When this happens the pilot is without knowledge of the air speed and is in a potentially dangerous situation. Such contamination can occur while the aircaraft is parked on a ramp or even in a hanger, causing obstruction and inaccurate airspeed indications.

Consequently, it is necessary that virtually all aircraft have a pitot tube cover in place to cover the inlet hole while the aircraft is not being flown. Pitot tube covers are available that can be slid over or strapped onto the pitot tube. There is a problem with conventional pitot tube covers, however. Despite having large visible RBF (Remove Before Flight), Flags attached numerous cases have been documented where pilots fail to remove the pitot tube cover prior to taking off, thereby contributing to a potential catastrophy. The conventional technology has addressed this problem in a number of ways.

U.S. Pat. No. 3,106,374, discloses an automatically releasable static discharge guard 10. This guard has a body 11 made of plastic rubber neoprene and includes a bore 17 for receiving the outer end 12 of a static discharge tube. The other end of the guard 10 is provided with a frusto-conical section 19 have an open end 21. In the event that the guard is left on the static discharge tube 13 during flight, the air stream entering opening 21 causes the guard to be detached from the static discharge tube 13.

U.S. Pat. No. 2,786,353 discloses a pitot tube cover for selective placement over a pitot tube 12. The cover includes a shell 18 having an end closure 20 and a funnel-shaped flange 22 at the forward end of the shell. The cover is made of plastic or metal, and is provided with a thin section or weakened ridges 24 which extends along the entire length of the cover. In the event that the cover is left on the pitot tube, the air stream entering the flange 22 causes the shell 18 to break apart at the ridges 24 and thereby fall off of the pitot tube.

U.S. Pat. No. 2,532,316 discloses an automatically releasable cover 2 for protecting a pitot tube 1. The releasable cover 2 as depicted in FIG. 3 and is made up of two L-shaped metal strips 4 and 41 fabricated of spring steel and which are stitched into the fabric 3. Two opposite latching studs or detents 6 and 61 are also provided so that, when the fabric 3 is folded over the pitot tube 1 as shown in FIG. 1, the spring steel metal strips 4 and 41 are retained together. A deflector 8 extends below the cover 2 and cooperates therewith in a manner whereby the air pressure against the deflector causes it to pivot and also causing the latching studs 6 and 61 to detach from one another thereby causing the cover 2 to fall from the pitot tube 1.

U.S. Pat. No. 2,488,810 discloses an automatic shutter mechanism for a pitot tube 2. The mechanism includes a shutter 6 attached to a shutter shaft 7 which extends through clamp bearing 13 and bears against the plunger spring 10. A wind pressure plane 12 is attached to the shaft 7. In operation, air being forced against the pressure plane 12 forces the pressure plane 12 along with shutter shaft 7 and shutter 6 rearwardly against the spring 10 thereby uncovering the opening 3 of pitot tube 2.

U.S. Pat. No. 5,026,001 discloses a pitot static tube cover 5 adapted to be received over an aircraft pitot tube 2. The cover is selectively mounted and dismounted by use of a long pole 24 and the holes 23 of crossbar 21.

U.S. Pat. No. Des. 351; U.S. Pat. No. Des. 337,0651; and, U.S. Pat. No. Des. 361,730 disclose pitot tube covers quite similar to that of U.S. Pat. No. 5,1026,001. Similarly, these covers require removal from the pitot tube by longitudinally sliding the cover on and off of the pitot tube.

Consequently, the conventional art does not meet the need for a safety pitot tube cover which will be automatically separated from the pitot tube once an aircraft, or other high speed vehicle reaches a predetermined speed. Such a cover must be light, simple and inexpensive so that it's loss in the air does not constitute an unreasonable expense. And must be of a material that upon ejection from the pitot tube during ground run, will not cause airframe damage.

SUMMARY OF THE INVENTION

Consequently, it is object of the present invention to provide a pitot tube cover that automatically exposes the opening of the pitot tube when the vehicle upon which the pitot tube is mounted reaches a predetermined speed.

It is another object of the present invention to provide an automatically removed pitot tube cover that is simple in design and very inexpensive.

It is a further object of the present invention to provide an automatically removable pitot tube cover that is easily operable when mounting on a pitot tube.

It is still another object of the present invention to provide a pitot tube cover that prohibits moisture and other contaminants from entering the opening of the pitot tube.

It is yet an additional object of the present invention to provide a pitot tube cover that is easily cleaned so as to avoid contamination of the pitot tube opening.

It is yet a further object of the present invention to provide an automatically removable pitot tube cover that is extemely light in weight and poses no hazard when released from an airplane at relatively high speeds.

These and other objects and goals of the present invention are achieved by a cover for a pitot tube that has an opening and is mounted on a vehicle. The cover includes a top portion of the top surface and a rear edge, as well as a bottom portion. The slot for holding the pitot tube in frictional engagement with the cover covers the opening of the pitot tube at an enclosed end of the slot. A pivot area is arranged along a bottom surface of the slot and at the rear edge of the cover. A wind surface rotates the cover about the pivot area thereby exposing the pitot tube opening when the wind surface is struck by the wind caused by vehicle movement.

In another embodiment of the present invention the goals and objects are achieved by a method of automatically removing a pitot tube cover from an opening of a pitot tube which is mounted on a vehicle. The cover has a slot configured to receive the pitot tube and a wind surface perpendicular to the slot. The method of automatically removing the device includes a first step of arranging the pitot tube along the bottom surface of the slot. The wind surface is arranged perpendicular to the direction of travel of the vehicle. Then the vehicle is moved at a predetermined speed which causes the cover to automatically separate from the pitot tube exposing the opening of the tube to the air.

BRIEF DESCRIPTION OF THE DRAWINGS

FIG. 1(*b*) is a perspective diagram of the pitot tube cover of the present invention fitted on the pitot tube.

FIG. 1(*c*) is a side elevation view of the pitot tube cover of the present invention mounted on a pitot tube.

FIG. 1(*d*) is a front elevation view of the pitot tube cover of the present invention.

FIG. 1 (*e*) is a side elevation view of the pitot tube cover of the present invention.

FIG. 1 (*f*) is a top view of the pitot tube cover of the present invention.

DETAILED DESCRIPTION OF THE PREFERRED EMBODIMENTS

The safety pitot tube cover is preferably made of low density polyethylene extruded foam or cross-linked polyethylene foam and can be made either by a molding process or by cutting and shaping from a larger block of polyethylene foam.

Figure 1A:
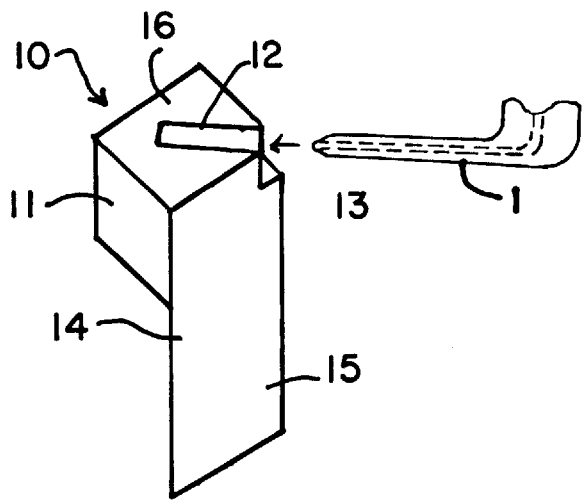
FIG. 1 (*a*) is a perspective view of the pitot tube cover and a separate pitot tube.
Figure 1B:
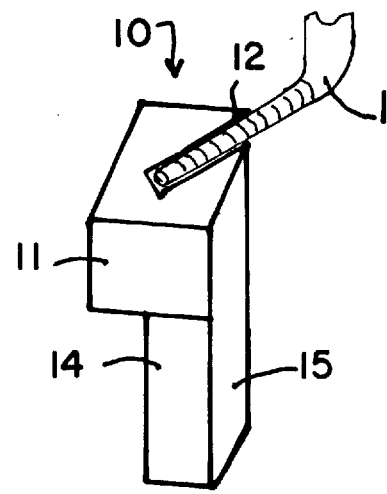
Figure 1C:
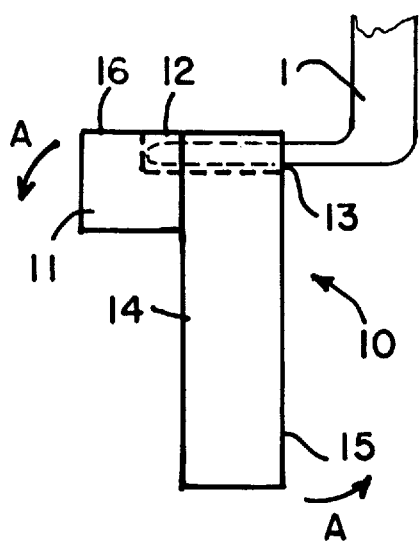
Figure 1D:
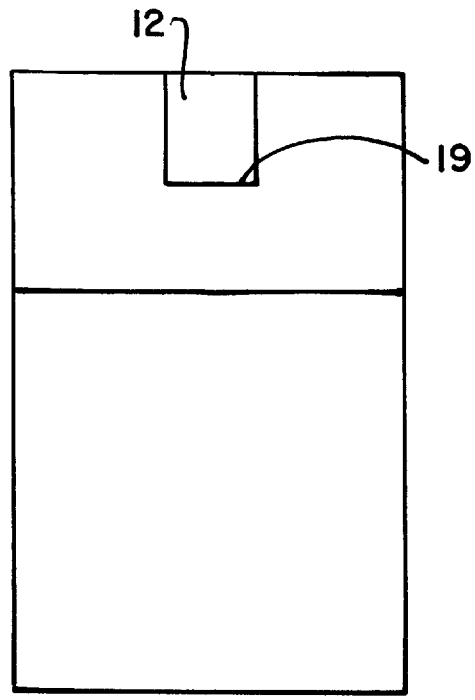
Figure 1E:
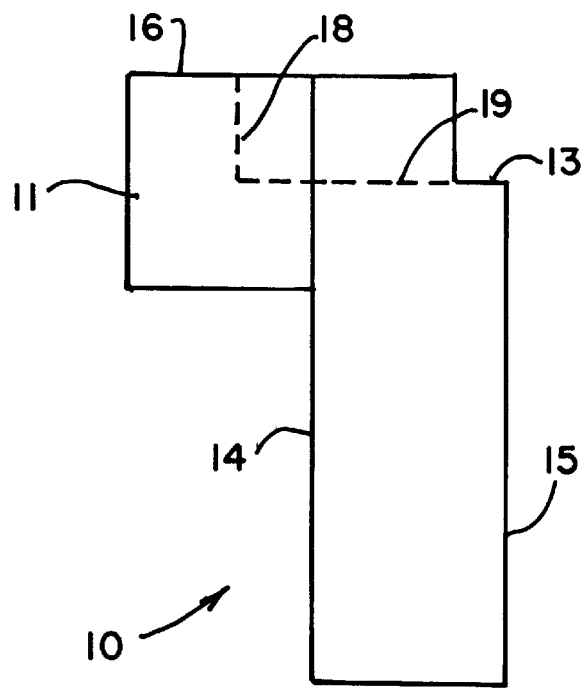
Figure 1F:
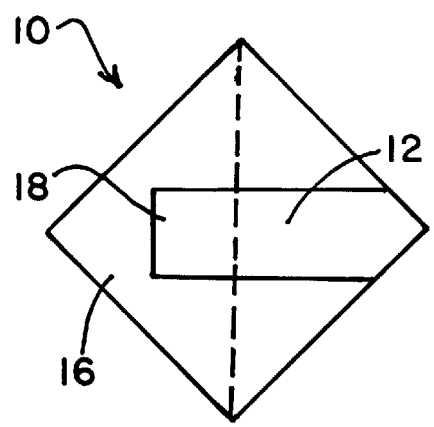

The operation of the present invention is best understood by reference to FIGS. 1(*a*)–(*f*). FIG. 1(*a*) is a perspective view of the pitot tube cover 10 and pitot tube 1, depicted as separate elements. FIG. 1(*b*) is also a perspective view depicting the cover 10 arranged to enclose pitot tube 1 within slot 12.

The pitot tube cover 10 has an upper portion 11 and a lower portion 15. The upper portion includes slot 12 which is cut into the top surface 16 and the back edge of the cover in a manner that forms a notch 13. Wind surface 14 is arranged in lower portion 15 to be substantially perpendicular to the direction of the pitot tube 1, as well as the direction of wind flow caused by movement of the vehicle upon which the pitot tube is mounted.

As depicted in FIG. 1(*c*) the pitot tube 1 preferably is arranged along the bottom surface of slot 12. Consequently, the pitot tube will also lie along the bottom of notch 13. The size of slot 12 is selected so that pitot tube 1 is maintained in frictional engagement with the sidewalls of the slot, and is held securely within the slot until a predetermined wind speed has been reached. This is easily accomplished since the preferred material for the pitot tube cover 10 is polyethylene foam. Thus, if slot 12 is originally be made too narrow for the pitot tube, it can easily widened by abrading or otherwise cutting the foam within the sidewalls of the slot. The slot itself can be cut within the top surface 16 so that the sidewalls are deep enough only to cover the pitot tube. If additional friction is needed, the slot can be cut more deeply so that a greater wind speed against wind surface 14 is required to separate the pitot tube from the slot.

When the vehicle upon which the pitot 1 is mounted reaches a predetermined speed, sufficient wind force will be developed on surface 14 so that the pitot tube cover 10 will rotate about notch 13 in directions indicated as (A) in FIG. 1(*c*). Notch 13 which extends beyond the sidewalls of slot 12 serves as the pivot area upon which the cover 10 rotates to separate from the pitot tube 1.

Preferably, slot 12 is cut in the form of a rectangle with a flat bottom surface 19 as depicted in FIG. 1(*d*). However, depending upon the wind speed necessary to cause rotation around pivot area 13 different configurations for slot 12 can be utilized.

As depicted in FIG. 1(*d*) cover 10 has a longitudinal axis and a latitudinal axis. The top portion 11 is much larger along the latitudinal axis than is the lower portion 15. In the preferred embodiment the ratio is approximately 2 to 1. However, the latitudinal dimension of the lower portion 15 can be many times smaller than that of the top portion.

In the longitudinal direction, the length of the bottom portion 15 is at least equal to that of the top portion 11. However, the length of bottom portion 15 can be many times that of the top portion, depending upon the forces desired to separate the cover 10 from the pitot tube 1.

In normal operation when the cover 10 is placed over pitot tube 1, the opening of the pitot tube will rest against end wall 18 of slot 12. The pitot tube will also lie along bottom surface 19 of the slot, as well as along notch 13. This arrangement provides the best protection for the pitot tube to exclude contaminants while the vehicle is in a stationary position or is moving at speeds lower than that desired to separate the cover 10 from the pitot tube 1. In this manner, the protection of the pitot tube is maximized. Also, the correct calibration is achieved between the speed of the vehicle and the automatic removal of the pitot tube cover 10 once the vehicle reaches a predetermined speed.

As depicted in FIG. 1(*f*) the top surface 16 of the top portion 11 is rectangular in shape, providing no surface preferably perpendicular to the travel of the vehicle. Rather, this is provided by wind surface 14 in the bottom portion of cover 10 so that the correct forces can be developed that will rotate the cover about pivot area 13. In the alternative, the shape of the entire cover 10 can be circular, with the exception of the flat wind surface 14. Preferably, in either shape of cover 10, slot 12 will extend into the top portion further than the thickness (in a latitudinal direction) of the bottom portion 15.

In an example of a circularly shaped pitot tube cover 10, the diameter of the cover is approximately 2½ inches while the thickness of the slot 12 is 3/16 of an inch in order to accommodate a different style pitot tube of a flat blade configuration. Both the top and bottom portions 11, 15, extend 2.75 inches in the longitudinal direction. The slot 12 extends approximately 2½ inches from the top surface 16 being arranged from the rear surface to within approximately ½ inch of the front surface of the circular pitot tube cover. The wind surface 14, as always, is a flat surface perpendicular to the path of travel of the vehicle, and extends approximately 1¼ inch from the front surface of the top portion of the cover.

Since the pitot cover 10 is made of polyethylene foam, these devices are very inexpensive. Consequently, when a device is lost from an airplane in flight, the financial burden is minimal. In the alternative, some sort of flexible connector can be used to tie the pitot tube cover to the vehicle. Also, the pitot tube cover can be painted a bright color in order to alert the vehicle operator to it's presence so that it can be removed and reused.

While a number of embodiments have been described by way of example, the present invention is not limited thereby. Rather, the present invention should be interpreted to cover any and all variations, permutations, configurations, adaptations, and modifications that would occur to one skilled in this art who has been taught the present invention. For example, any number of different slot configurations can be used as well as a large variety of different sizes and proportions of the top and bottom portions. Consequently, the present invention should be limited only by the following claims.

I claim:
1. A cover for a pitot tube having an opening and mounted on a vehicle, said cover comprising:
   (a) a top portion having a top surface and a rear edge;
   (b) a bottom portion;
   (c) slot means for holding said pitot tube in frictional engagement, covering said opening of said pitot tube at an enclosed end of said slot means for holding;
   (d) a pivot area arranged along a bottom surface of said slot means and said rear edge; and,
   (e) wind surface means for rotating said pitot tube cover about said pivot area thereby exposing said pitot the opening when said wind surface means is struck by wind caused by vehicle movement.
2. The pitot tube cover of claim 1, wherein said cover is made of low-density material which returns to its original shape after bing distorted.
3. The pitot tube cover of claim 2, wherein said frictional engagement is calibrated so that said cover pivots from said pitot tube opening at a predetermined vehicle speed.
4. The cover of claim 1 wherein said wind surface means is contained in said lower portion.
5. The cover of claim 4, wherein said wind surface means comprises a wind surface arranged substantially perpendicular to the direction of wind flow caused when said vehicle moves.
6. The pitot tube cover of claim 5, wherein said wind surface extends perpendicular to said bottom surface of said slot.
7. The pitot tube cover of claim 6, wherein said cover has a longitudinal axis and a latitudinal axis, and said wind surface extends for at least one-half a distance of said cover along said longitudinal axis.
8. The pitot tube cover of claim 7, wherein a distance along said latitudinal axis of said cover is greater for said top portion than for said bottom portion.
9. The pitot tube cover of claim 8, wherein said top surface of said top portion is rectangular in shape.
10. The pitot tube cover of claim 8, wherein said top surface of said top portion is circular in shape.
11. The pitot tube cover of claim 1, wherein said pivot area extends outside said slot from said bottom surface of said slot.

* * * * *